C. LINE.
AUTOMOBILE RUNNING GEAR ALINER.
APPLICATION FILED MAR. 25, 1915.

1,202,076.   Patented Oct. 24, 1916.

Witnesses:
Leonard W. Novander
John A. Skinner

Inventor
Charles Line
By Brown, Hanson & Boettcher
Attys

UNITED STATES PATENT OFFICE.

CHARLES LINE, OF CHICAGO, ILLINOIS.

AUTOMOBILE-RUNNING-GEAR ALINER.

1,202,076.  Specification of Letters Patent.  Patented Oct. 24, 1916.

Application filed March 25, 1915. Serial No. 16,826.

*To all whom it may concern:*

Be it known that I, CHARLES LINE, a citizen of the United States, residing at Chicago, in the county of Cook and State of Illinois, have invented a certain new and useful Improvement in Automobile - Running-Gear Aliners, of which the following is a full, clear, concise, and exact description, reference being had to the accompanying drawings, forming a part of this specification.

The present invention provides an improved automobile running gear aliner. Satisfactory operation of an automobile depends largely upon the correct assembly, adjustment and care of the running gear. There is a great tendency to overlook this feature in view of the fact that casual inspection of the parts cannot reveal faults that may be causing, or likely to cause serious trouble. If the running gear is out of alinement a very heavy wear on the tires results and the cause, though easily corrected, is hard to detect, inasmuch as the eye cannot be depended upon to catch anything but very obvious faults. Poor adjustment also causes hard steering and causes the wheels to lean constantly to one side or the other.

The object of my invention is to provide means for readily detecting, locating and correcting faults in the alinement of the running gears of an automobile or the like.

In the accompanying drawings, which form a part of the present specification, I have illustrated one embodiment of my invention.

Figure 1:
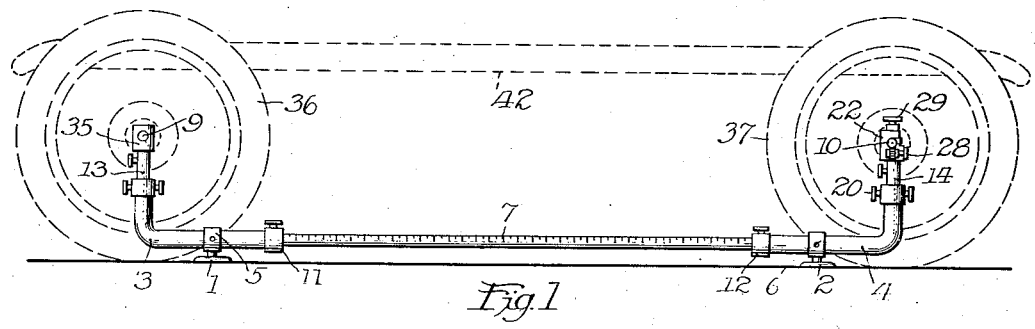
Figure 2:
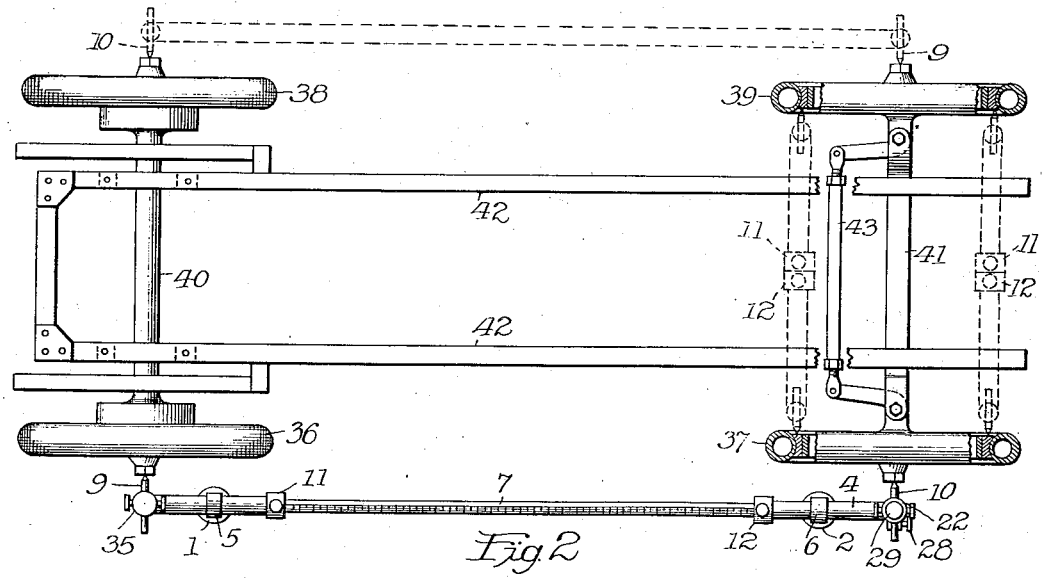
Figure 3:
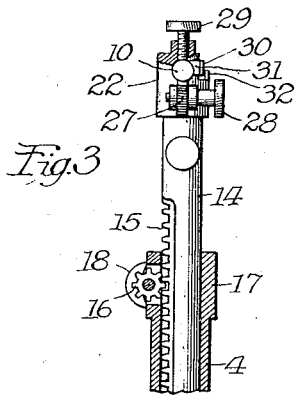
Figure 5:
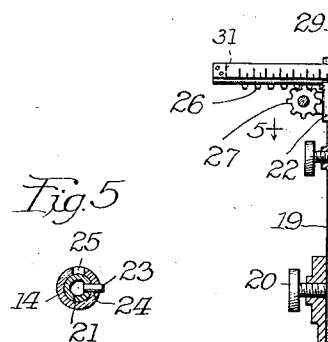
Figure 4:
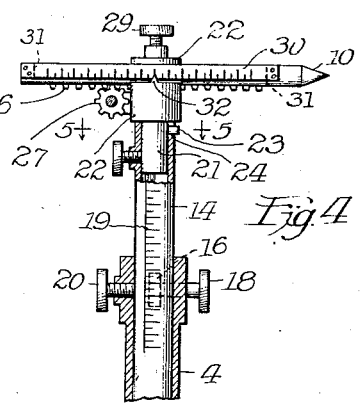

Figure 1 is a side elevation thereof, showing the manner in which the alining means is applied to the centers of the front and rear wheels of an automobile or the like in order to determine whether the wheels are turning on parallel axes. Fig. 2 is a plan view of the same indicating in addition to the above the manner in which the aliner is applied showing the same applied to the side wheels of an automobile or the like to determine whether the front wheels are properly adjusted. Fig. 3 is a cross-sectional view of one of the standards, showing the adjusting means for raising and lowering the gage finger as well as a means for moving the same back and forth in a horizontal direction. Fig. 4 is a view taken at right angles to Fig. 3, and Fig. 5 is a cross-section taken on the line 5, 5, of Fig. 4.

The alining means which I have provided normally rests upon the floor on a pair of pedestals 1 and 2, each having secured thereto an L-shaped tube 3 and 4 respectively, having a horizontal leg and a vertical leg, the pedestal or foot being secured to the horizontal leg by means of a collar 5 and 6 respectively. The horizontal arms of the tubes 3 and 4 are joined by means of a telescoping connection 7 which is graduated to indicate the proper setting for a given distance or an approximation thereof. Between the ends of the two gage point members 9 and 10, the horizontal arm of each of the L-shaped tubes 3 and 4 is provided with a set-screw or other clamping means 11, 12 respectively for holding the telescoping connection 7 in any predetermined position. The vertical arm of the L-shaped tube 4 is provided with a telescoping plunger 14 which has a rack attached thereto or teeth 15 cut therein, the teeth of the rack coöperating with a pinion 16 having a bearing in the collar 17 secured to the top of the vertical arm of the tube 4. The pinion 16 is connected with a knurled handle 18 by means of which the same may be readily turned to raise or lower the plunger 14. The plunger 14 is provided with graduations 19 upon the side thereof which in coöperation with the top of the collar 17 gives a reading of the height of a gage-finger 10 above the pedestal 2. The plunger 14 may be clamped in any desired position by means of the thumb screw 20. The plunger 14 is hollow and receives at its open end a stem 21 of the gage head 22. The gage head 22 is provided with a pin 23 which fits in notches 24 and 25, which are placed at right angles to each other so that the gage point member 10 will be exactly in line with the connection between the two pedestals or at right angles thereto. The gage point member 10 which may be circular or rectangular in cross-section, is slidably mounted in the head 22, its adjustment being attained by means of the rack 26 and the pinion 27 which is connected to the knurled handle 28 by which it is movable. The gage-point member 10 may be set in any desired position by means of a set screw 29. A scale 30, graduated in any desired manner is attached by means of a block 31 to the finger 10, and slides over the flat side of the head 22 in front of a pointer which forms a zero point for the graduations on the scale 30. The vertical arm of the L-shaped tube 3 is provided with a plunger 13, similar to the plunger 14. This plunger is provided with rack and pinion means for raising the same, similar to the means shown in connection with the plunger 14. The plunger 13 bears a head 35 bearing the gage point member 9 which, however, is not adjustable in the head 35. The head 35 is provided with a pin coöperating with notches in the plunger 13, as was described in connection with the plunger 14, in order to allow adjustment of the head in the two right-angled positions.

I shall now proceed to describe the manner in which the aliner may be employed in alining the running gear of an automobile. The gage point members 9 and 10 are set both in the right-angled position, the fixed gage-point member 9 being set at the center of one of the wheels, such for instance, as the rear wheel 36, shown in Figs. 1 and 2, and the telescoping connection 7 is adjusted to bring the other gage-point member 10 at the center of the hub of the front wheel 37. It is assumed at this time that the front wheels are set by means of the steering gear to run the vehicle straight forward and the tires of all four of the wheels are inflated to the same pressure. The graduated telescoping connection 7 indicates a distance between centers of the members 9 and 10. The aliner is then applied to the wheels 38 and 39 on the opposite side of the vehicle. This will at once make apparent any lack of parallelism between the rear shaft 40 and the setting of the front wheels 37 and 39. It may be that the rear axle 40 is not exactly at right angles to the frame 42 due to a slipping between the axle and the frame. Assuming that the front and rear wheels have been set so that each side measures the same from center to center, it will now be possible to tell the degree of error that exists either by sighting along the side wheels or by running the car forward. The above described operation is a quick determination of the existence of any faults. In order to systematically locate the fault and to correct the same, the following operation will be carried out. The vehicle is set with the front wheels leading forward as nearly as can be determined by the eye. The telescoping connection 7 is removed and a shorter section substituted so that the collars 11 and 12 will come in contact. The two parts are then secured in this position by setting the thumb nut to each of the collars 11 and 12. The gage point members 9 and 10 are moved into the position at right angles to that shown in Fig. 1 so that they point in the same general line as the line joining the two pedestals 1 and 2, thus forming an interior adjustable gage. The scale 30 which is mounted on the adjustable finger 10 is graduated preferably to indicate the distance between the gage points when the device is in the present condition. The gage point members 9 and 10 are both set to the height of the center of the hubs of the front wheels and then the device is employed in calipering the distance between the foremost parts of the rims of the front wheels and the rearmost parts of the rims of the same. The connection between the steering knuckles is then set so that the wheels 37 and 39 are parallel. Thereafter the distance between the centers of the front wheels and the centers of the back wheels is made equal, as previously described, to insure that these four points form the corners of a rectangle. If it is now desired that the front wheels have a slight convergence in front, such as is known to give the best performance, the same may now be secured by adjusting the rod connecting the steering knuckle.

It will be apparent from the above description that I have produced a device of great utility and simplicity in operation and that a degree of accuracy, greater than that ordinarily required in setting or alining the running gear of a vehicle, is secured. It is to be understood that the device may be made in various sizes and various forms, the adjustable part being so arranged as to comply with the measurement of different makes of cars or vehicles. The vertical adjustment allows of the measurement and alinement of different sized wheels, while the horizontal adjustment allows of the measurement and alinement of cars having different lengths of wheel base. In employing the device as an inside caliper between the front wheels, it is desirable that the gage point members 9 and 10 be set at the height of the center of the wheels in order to secure the greatest accuracy.

It will be apparent to those skilled in the art that numerous changes or modifications may be made. I consider such changes or modifications to come within the spirit and scope of my invention.

What I claim as new and desire to protect by Letters Patent of the United States, is the following:

1. In a device for truing the wheels of automobiles and the like, a pair of uprights, a horizontal connection adjustably joining said uprights supported from the floor, each of the uprights having a member adjustable vertically thereon, a gage-point member on each of said members, and means to adjust one of said gage-point members horizontally, relative to the uprights upon which it is mounted.

2. In a device for truing the wheels of automobiles and the like, a pair of pedestals, means adjustably connecting said pedestals, a hollow vertical member on each end of said means, a plunger in each of said members, means for positively moving said plungers to adjust the same, one of said plungers having a scale thereupon, a gage-member on each plunger, means for moving said gage-members to adjust the same, and means for clamping said plungers and said members respectively.

3. In a device for truing the wheels of automobiles and the like, a pair of pedestals, a hollow L-shaped tube on each of said pedestals, each tube having a vertical arm and a horizontal arm, a connection telescoping into the horizontal arm of each of said tubes, a vertical plunger adjustable in each of said vertical arms, and a gage-member on each of said plungers, one of said gage-members being adjustable.

4. In a device for truing the wheels of automobiles and the like, a pair of pedestals, a hollow L-shaped tube on each pedestal, each tube having a vertical arm and a horizontal arm, a connection telescoping into the horizontal arm of each of said tubes, a vertical plunger for each of said vertical arms, means for positively moving said plungers to adjust the same vertically, a gage-member on each plunger, and means for positively moving the gage-member on one of said plungers to adjust the same horizontally.

5. In a device for truing the wheels of automobiles and the like, a pair of uprights, means adjustably connecting said uprights, a vertical plunger for each of said uprights, rack and pinion means for adjusting said plungers vertically, a gage-member on each of said plungers, rack and pinion means for adjusting one of said gage-members horizontally, and means for holding said plungers and said gage-member against movement, respectively.

6. In a device for truing automobile wheels and the like, a pair of pedestals, an L-shaped member carried on each pedestal, each member having a vertical arm and a horizontal arm, said horizontal arms being connected together, a member carried by and vertically movable relative to each vertical arm, and a gage-member on each movable member.

7. In a device for truing automobile wheels and the like, a U-shaped frame comprising a horizontal member and two vertical members, a member carried by and vertically movable relative to each vertical member, and a gage-member on each movable member.

8. In a device for truing automobile wheels and the like, two upright members, a member carried by and vertically movable upon each upright member, a gage-member on each adjustable member, and means for rigidly connecting said members.

In witness whereof, I hereunto subscribe my name this 22nd day of March A. D., 1915.

CHARLES LINE.

Witnesses:
LESLIE W. FRICKE,
ERNEST W. RAPALEE.